United States Patent Office 3,320,274
Patented May 16, 1967

3,320,274
N,N'-DI(3-AMINOPROPYL)ETHYLENE UREA
Billy E. Lloyd, Hopewell, Va., assignor to Allied Chemical Corporation, New York, N.Y., a corporation of New York
No Drawing. Filed Aug. 16, 1963, Ser. No. 302,717
1 Claim. (Cl. 260—309.7)

This invention relates to N,N'-di(3-aminopropyl)ethylene urea and to a method for preparing it.

The new compound, N,N'-di(3-aminopropyl)ethylene urea is useful as a fungicide against brown rot of stone fruits and target spot of clover and other fungus infestations.

The new, N,N'-di(3-aminopropyl)ethylene urea of my invention may be prepared by catalytically hydrogenating N,N'-di(2-cyanoethyl)ethylene urea at temperatures between about 25° C. and about 120° C., preferably between about 60° C. and about 90° C. in the presence of liquid ammonia and a Raney nickel catalyst. The hydrogenation proceeds according to the following equation:

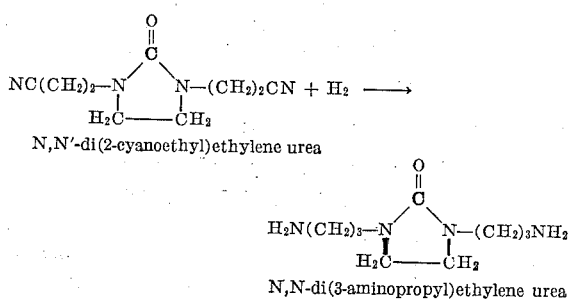

In order that the hydrogenation may proceed satisfactorily, it is essential that the N,N'-di(2-cyanoethyl) ethylene urea used as starting material have a high degree of purity. I have found that suitable purity is indicated by a melting point range between about 45° C. and about 47° C. This can readily be provided by subjecting crude liquid N,N'-di(2-cyanoethyl)ethylene urea (B.P. 185 to 234° C. at 3.5–5.0 mm. Hg) to vacuum distillation followed by recrystallization as from butyl alcohol.

The role of anhydrous liquid ammonia as a solvent for the hydrogenation reaction is also important since other common hydrogenation solvents, including methanol and ethanol are unsuccessful in promoting the hydrogenation. At least about equal parts of ammonia by weight of the N,N'-di(2-cyanoethyl)ethylene urea should be used for best results, preferably slightly above equal parts by weight, preferably between about 1 part and about 1.5 parts per part of N,N'-di(2-cyanoethyl) ethylene urea.

Any of the commonly used hydrogenation catalysts may be used, such as nickel and the noble metals, platinum and palladium. Especially suitable are the nickel catalysts such as Raney nickel. Hydrogenation pressures between about 800 p.s.i.g. and about 2,000 p.s.i.g. are suitable.

The following example illustrates the preparation of N,N'-di(3-aminopropyl)ethylene urea. Parts are by weight except as otherwise indicated.

*Example*

To a stainless steel autoclave was added 50.0 grams of N,N'-di(2-cyanoethyl)ethylene urea (M.P. 45° C. to 47° C.) purified by vacuum distillation followed by recrystallization from butyl alcohol, 10 grams Raney nickel, and 61 grams of anhydrous ammonia. The vessel was pressurized to 1,400 p.s.i.g. with hydrogen and heated to 60°–90° C. for three hours. Additional hydrogen was added as the reaction proceeded until theoretical uptake was realized. The autoclave was cooled, vented and the product washed from the bomb with absolute ethanol and filtered from the catalyst. Evaporation of the alcohol solution gave a syrupy liquid which was vacuum distilled at 162°–167° C. at 0.1–0.25 mm. Hg pressure. Yield of liquid N,N'-di(3-aminopropyl)ethylene urea was 85% of theory.

Analysis showed.—Calculated: C, 53.97%; H, 10.06%; N, 27.98%. Found: C, 53.92%; H, 10.19%; N, 28.00. $n_D^{25}$ $1.5_{110}$, neutral equivalent calculated 100, found 103.6.

The N,N'-di(3-aminopropyl)ethylene urea is a water-soluble liquid and is effective for retarding and preventing fungus growth on plants, and when applied thereto in small dosages as a solution in water, can be effectively used as a fungicide without serious injury to the plant itself. This active fungicide material is also suitably applied to the plant as a dusting powder in which the N,N'-di(3-aminopropyl)ethylene urea is mixed with a solid inert diluent, such as a granular swelling type bentonite clay or other absorbent dust.

Wettable formulations, suitable for dispersing in water and applying the water dispersion to the plants, are prepared by incorporating in any of these dusting compounds small amounts of ionic surface active materials, for example, about 1% to about 5%, by weight, which serve to maintain the finely powdered composition dispersed in water with which it is mixed. Suitable surface active materials are the anionic and cationic, wetting dispersing and emulsifying agents commonly employed in the formulation of wettable powder compositions, for example, the alkali metal and ammonium salts of long chain aliphatic carboxylic acids, sulfonates of the aromatic or long chain aliphatic hydrocarbons, such as sodium alkyl sulfates and sulfonates, alkyl aryl sulfonate salts, sulfonates of glycerides and their fatty acids, and sulfonates of derivatives of fatty acid esters. In general it is preferred to employ the anionic surface active agents and to formulate these wettable powders containing the N,N'-di(3-aminopropyl)ethylene urea to include both wetting agent and dispersant or emulsifying agent, which is common practice in preparing formulations of powdered materials to be dusted onto or, dispersed in water, sprayed onto living plants.

Spray formulations can also be prepared by dissolving N,N'-di(3-aminopropyl)ethylene urea in water or in suitable organic solvents such as acetone, and, in the case of the acetone solution, dispersing this solution in water. Concentrated solutions of the N,N'-di(3-aminopropyl)

ethylene urea in water or water dispersible solvents may be prepared and further dispersed in water to give an aqueous spray of suitable concentration of the N,N'-di(3-aminopropyl)ethylene urea for application to the plants. In general the aqueous solutions or dispersions which are applied to living plants will contain about ¼ lb. to about 2 lbs., preferably about ½ lb. to about 1 lb. of the N,N'-di(3-aminopropyl)ethylene urea for every 100 gallons of water.

The new N,N'-di(3-aminopropyl)ethylene urea was subjected to standard spore germination tests against *Sclerotinia fructicola* (brown rot of stone fruits) and *Stemphylium sarcenaeforme* (target spot of clover) and in greenhouse tests against *Venturia inaequalis* (apple scab) with the results shown in Tables I and II below.

In the tests, the N,N'-di(3-aminopropyl)ethylene urea designated "Compound A" in the tables, was formulated as a 1% solution in acetone which was then further diluted with water to the indicated concentrations in parts per million in the spore germination tests (Table I). In the greenhouse tests on apple scab the compound was sprayed to run-off from a spray containing ¼ pound of compound per 100 gallons of spray. "Captan" used as a comparison treatment is a commercial fungicide containing N-trichloromethylmercapto-4-cyclohexene-1,2-dicarboximide.

The spores used in the tests were produced by growing the fungus on potato dextrose agar for one week. The spores were taken up in a 0.5% sodium citrate solution which acts as a stimulant to spore germination. Portions of this spore suspension with addition thereto of the several diluted N,N'-di(3-aminopropyl)ethylene urea were incubated 24 hours at 65° C. Like specimens with addition of copper sulfate (as a standard fungicide) and of tap water as a check, were also prepared and incubated for comparative and check purposes, respectively.

TABLE I.—SPORE GERMINATION TESTS
[Percent spore germination at 1,000, 100, 10 and 1 p.p.m.]

| Compound | Sclerotinia (Brown Rot) | | | | Stemphylium (Target Spot) | | | |
| --- | --- | --- | --- | --- | --- | --- | --- | --- |
| | 1,000 | 100 | 10 | 1 | 1,000 | 100 | 10 | 1 |
| Cpd A | 0 | 0 | 12 | 99 | 0 | 0 | 96 | 97 |
| Cu++ (from CuSO₄) | 0 | 0 | 97 | 98 | 0 | 0 | 97 | 98 |
| Check | | | 98 | | | | 98 | |

TABLE II.—APPLE SCAB PROTECTANT TEST (*VENTURIA INAEQUALIS*), INFECTION WITH APPLE SCAB

| Compound [1] | Plants | Leaves | Percent Leaf Area | Spray Injury |
| --- | --- | --- | --- | --- |
| Cpd A | 0 | 0 | 0 | Slight pucker and curl. |
| "Captan" | 0 | 0 | 0 | None. |
| Check | 3 | 12 | 57 | None. |

[1] At ¼ pound actual per 100 gallons of spray.

It will be noted from the tables that at a dosage as low as 100 parts of N,N'-di(3-aminopropyl)ethylene urea per million of solution, complete control of the spores of both Sclerotinia and Stemphylium was obtained, these results being equal to the standard copper sulfate fungicide. Similarly, the N,N'-di(3-aminopropyl)ethylene urea completely controlled apple scab in the greenhouse tests and was equal to "Captan" in this regard.

While the above describes the preferred embodiments of my invention, it will be understood that departures may be made therefrom within the scope of the specification and claim.

I claim:
N,N'-di(3-aminopropyl)ethylene urea.

References Cited by the Examiner

UNITED STATES PATENTS

| | | | |
| --- | --- | --- | --- |
| 2,540,170 | 2/1951 | Law et al. | 167—33 |
| 2,540,171 | 2/1951 | Kiff | 167—33 |
| 2,824,118 | 2/1958 | Frank et al. | 260—583 |
| 2,956,075 | 10/1960 | Boffa et al. | 260—583 |
| 3,035,062 | 5/1962 | Hageman | 260—309.7 |
| 3,058,849 | 10/1962 | Bakke et al. | 260—309.7 X |
| 3,091,617 | 5/1963 | Burris | 260—309.7 |
| 3,117,162 | 1/1964 | Rylander et al. | 260—583 |

OTHER REFERENCES

Sidgwick: The Organic Chemistry of Nitrogen (New Edition), pages 16–17, Oxford, Clarendon Press, 1937.

WALTER A. MODANCE, *Primary Examiner.*

JULIAN S. LEVITT, *Examiner.*

N. TROUSOF, D. B. MOYER, *Assistant Examiners.*